(12) United States Patent
Wheeler et al.

(10) Patent No.: US 7,389,872 B2
(45) Date of Patent: Jun. 24, 2008

(54) PROTECTIVE CLEAN ROOM COVERING FOR NOTEBOOK COMPUTER

(75) Inventors: Benjamin R. Wheeler, Beacon, NY (US); Jeffrey P. Gifford, Fishkill, NY (US); Peter J. Shaffer, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/904,016

(22) Filed: Oct. 19, 2004

(65) Prior Publication Data

US 2006/0081489 A1 Apr. 20, 2006

(51) Int. Cl.
*B65D 85/00* (2006.01)
(52) U.S. Cl. .................. 206/320; 206/576; 361/683
(58) Field of Classification Search ........... 206/320, 206/576, 776–778, 782, 438; 150/154, 165; 229/87.02, 87.06; 361/680, 681, 683, 687, 361/688
See application file for complete search history.

(56) References Cited

U.S. PATENT DOCUMENTS

| 5,931,297 | A | | 8/1999 | Weill et al. | |
|---|---|---|---|---|---|
| 5,938,096 | A | * | 8/1999 | Sauer et al. | 206/320 |
| 5,957,831 | A | * | 9/1999 | Adair | 206/438 |
| 6,066,404 | A | | 5/2000 | Suzuura et al. | |
| 6,149,001 | A | * | 11/2000 | Akins | 206/320 |
| 6,659,274 | B2 | | 12/2003 | Enners | |
| 7,031,148 | B1 | * | 4/2006 | Lin | 361/683 |
| 2004/0066613 | A1 | | 4/2004 | Leitao | |

FOREIGN PATENT DOCUMENTS

JP 2000311059 A 11/2000

* cited by examiner

*Primary Examiner*—Luan K Bui
(74) *Attorney, Agent, or Firm*—DeLio & Peterson LLC; Peter W. Peterson; James J. Cioffi

(57) ABSTRACT

A clean room covering or enclosure for a portable computer, wherein the computer has a keyboard portion and a screen portion connected by a hinge foldable between closed and open positions. The enclosure comprises a flexible sleeve for receiving the keyboard portion of the portable computer, with the sleeve having an opening through which the keyboard portion is inserted and removed, a transparent portion for viewing and operating the keyboard and a gas permeable vent portion adapted to restrict flow of contaminant particles. A flexible flap extends from the sleeve portion and is adapted to wrap around and over the screen portion of the portable computer, and has a transparent portion for viewing the screen. The enclosure also includes a reclosable seal for securing the flexible flap around the screen portion. The reclosable seal preferably secures the flexible sleeve opening to restrict flow of contaminant particles.

19 Claims, 3 Drawing Sheets

PROTECTIVE CLEAN ROOM COVERING FOR NOTEBOOK COMPUTER

FIELD OF THE INVENTION

The present invention relates to packaging a portable computer for use in a manufacturing clean room environment.

DESCRIPTION OF RELATED ART

Modern clean room manufacturing environments for manufacturing microelectronic and other devices utilize numerous techniques for remaining substantially free of contaminants including the use of air showers, sticky mats and suits for workers made of well known material such as Dupont Tyvek and the like. Class 10 clean rooms require that the environment be substantially free of particles of diameter greater than 0.5 microns.

Many modern clean room environments are enabled with wireless networking connectivity, and it is common and often necessary for workers to utilize portable computers in the clean room environment. Today's laptop computers are truly portable and the environments they are used in vary widely. People use them outside, leave them in automobiles, homes or offices where they can and do pick up dust and dirt, either in the keyboard area or internally. Transporting these laptops into a clean room can defeat the overall purpose of a clean room by bringing a nonclean piece of equipment into the environment. Particles, dust and oils can enter the laptop casing by the cooling fan or by other openings, or can become lodged in the keyboard area, risking contamination which may lead to defects and yield loss of manufactured goods.

In the past, precautionary measures have not been taken to protect the clean room environment from contaminants that may be present in portable computers. If the problem has been recognized, one solution has been to keep laptops in clean room and do not permit them to leave, and do not permit outside contaminated portable computers to enter.

SUMMARY OF THE INVENTION

Bearing in mind the problems and deficiencies of the prior art, it is therefore an object of the present invention to provide a method and apparatus for protecting clean room environments from contaminants in portable computers.

It is another object of the present invention to provide a method and apparatus for protecting clean rooms from laptop computers that may be easily employed by the clean room worker.

A further object of the invention is to provide a readily reusable method and apparatus for protecting a clean room from contamination by a portable computer.

It is yet another object of the present invention to provide a method and apparatus for protecting a clean room environment from contaminants in a portable computer which does not interfere with use of the computer.

Still other objects and advantages of the invention will in part be obvious and will in part be apparent from the specification.

The above and other objects, which will be apparent to those skilled in art, are achieved in the present invention which is directed to a clean room covering or enclosure for a portable computer, wherein the computer has a keyboard portion and a screen portion connected by a hinge foldable between closed and open positions. The enclosure comprises a flexible sleeve for receiving the keyboard portion of the portable computer, with the sleeve having an opening through which the keyboard portion is inserted and removed, a transparent portion for viewing and operating the keyboard and a gas permeable vent portion adapted to restrict flow of contaminant particles. A flexible flap extends from the sleeve portion and is adapted to wrap around and over the screen portion of the portable computer, and has a transparent portion for viewing the screen. The enclosure also includes a reclosable seal for securing the flexible flap around the screen portion. The reclosable seal preferably secures the flexible sleeve opening to restrict flow of contaminant particles.

In another aspect, the present invention which is directed to a method of reducing clean room contamination from a portable computer comprising providing a portable computer having a keyboard portion and a screen portion connected by a hinge foldable between closed and open positions. Also provided is a portable computer enclosure having a flexible sleeve for receiving the keyboard portion of the portable computer, the sleeve having a flexible transparent sleeve portion for viewing and operating the keyboard and a gas permeable vent portion adapted to restrict flow of contaminant particles; and a flexible flap having a transparent flap portion. The method then includes inserting the computer keyboard portion through the enclosure opening such that the flexible transparent sleeve portion is in registration with the keyboard, wrapping the flexible flap around the computer screen portion such that the transparent flap portion is in registration with the screen, securing the flexible flap around the screen portion, and using the portable computer in the clean room. As a result, contaminant particles above about 0.5 microns in the portable computer are restricted from entering the clean room by the gas permeable vent portion in the enclosure sleeve.

The computer screen portion is disposed in a lid having a front side containing the screen and a back side opposite the screen, and the flexible flap is preferably adapted to extend continuously from the hinge, along the back side of the lid and around the lid front side, and the reclosable seal is preferably adjacent an edge of the lid between the front and back sides. More preferably, the reclosable seal is secured along the back side of the computer lid. The flexible flap may extend from the sleeve portion adjacent the sleeve opening and include edges adapted to wrap around the sides of the computer lid.

The gas permeable vent portion and the reclosable seal are adapted to restrict flow of contaminant particles larger than 0.5 microns in size. Except for the transparent sleeve portion, the gas permeable vent portion may comprise a substantial portion of the flexible sleeve. Alternatively, except for the transparent sleeve portion and the gas permeable vent portion, the flexible sleeve may comprise a substantially gas impermeable material. The flexible flap may include a gas permeable vent portion adapted to restrict flow of contaminant particles.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-5 of the drawings in which like numerals refer to like features of the invention.

The present invention is directed to a clean room covering or enclosure for a portable or notebook computer or similarly constructed portable electronic device. Portable computer as used herein refers to an electronic device that has a microprocessor, a base having an input keyboard and a flip-type output viewing screen in a lid hinged to the base. The clean room enclosure prevents contaminants in or on the portable computer from being transferred into the clean room environment. The clean room enclosure is intended to be secured to the portable computer in the same area as the user dons his clean room suit, and removed when the user's clean room suit is removed.

The preferable material for the clean room computer enclosure of the present invention is a thin flexible breathable material or fabric that is breathable, but blocks the transmission of particles greater than about 0.5 micron in diameter. Preferably, the air permeability (i.e., breathability) is at least about 1 cfm/cm$^2$. Also, the material should preferably have a low static decay rate. Possible breathable materials that block such contaminant flow are Dupont Tyvek (spin bonded high density polyethylene fibers) and fabrics made of multi-filament polyester with interwoven carbon fibers, high density taffeta, or Dacron polyester.

Figure 1:
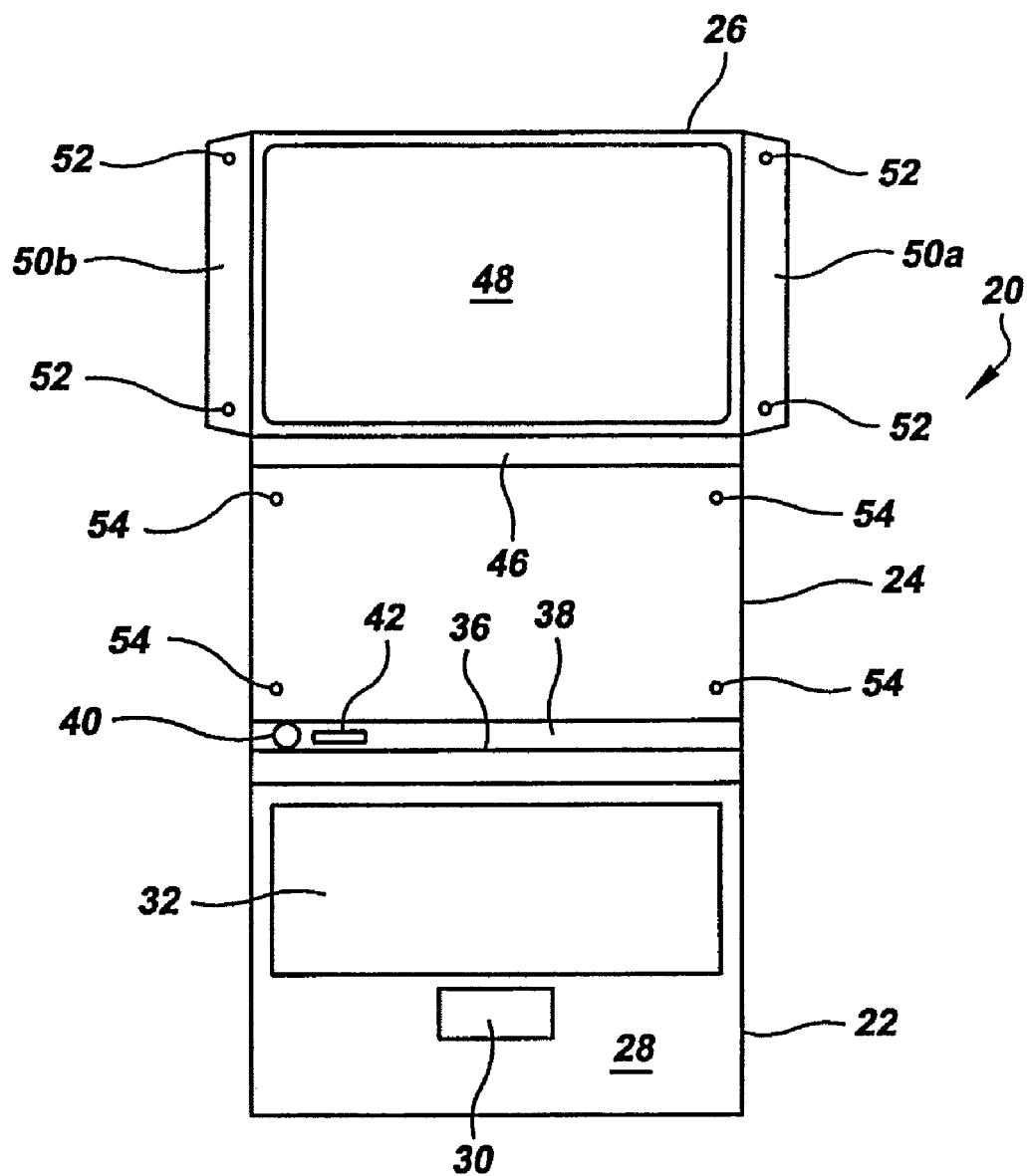
FIG. 1 is a top plan view of the preferred clean room enclosure for a portable computer in its unfolded form.
Figure 2:
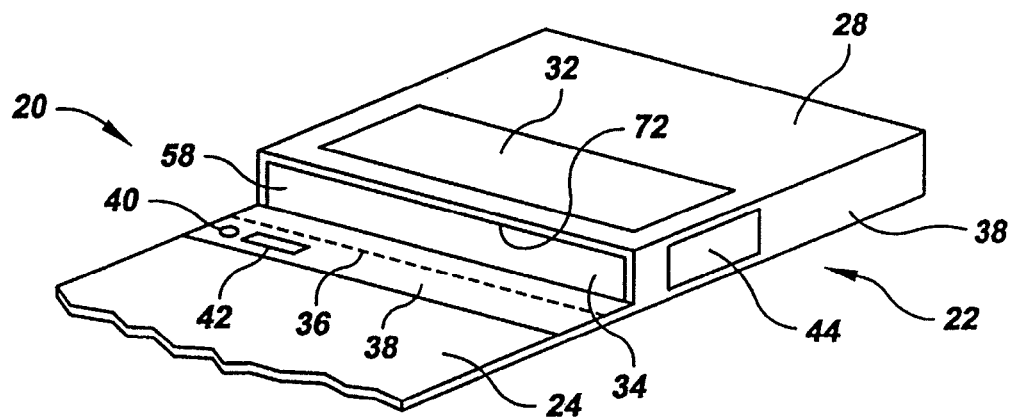
FIG. 2 is a perspective view showing the rear of the clean room cover sleeve for receiving the portable computer base, along with a portion of the lid cover.
Figure 3:
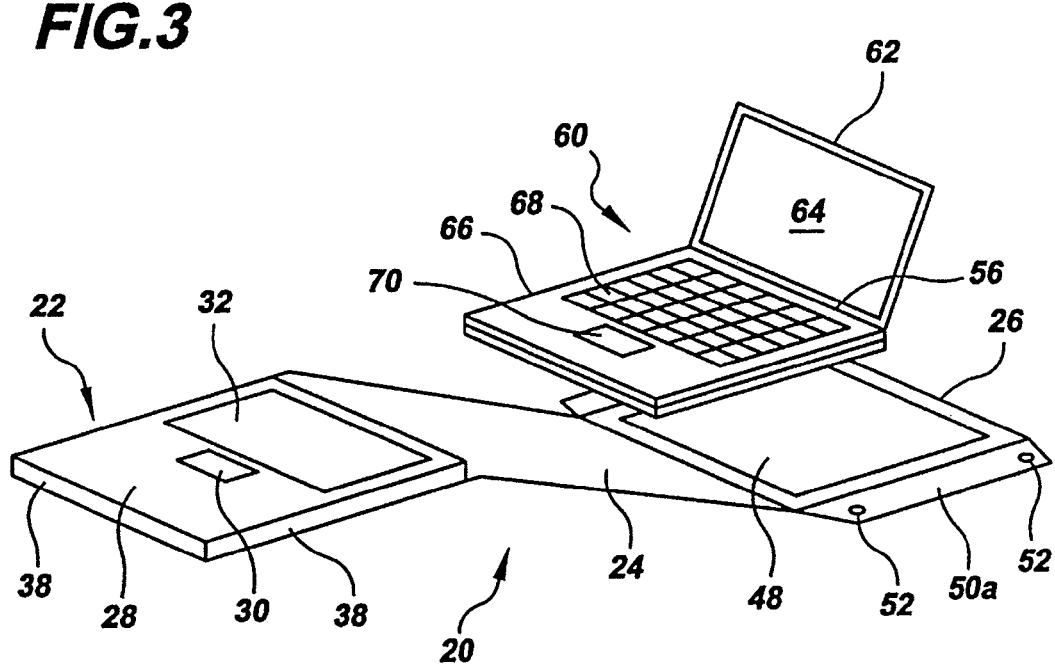
FIG. 3 is a perspective view showing a portable computer prior to insertion in the clean room enclosure of the present invention.
Figure 4:
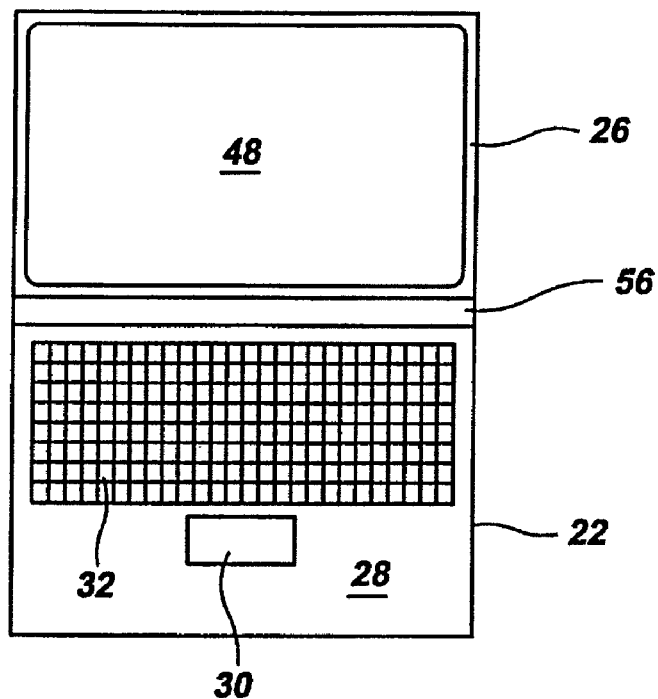
FIG. 4 is a top plan view showing a portable computer in the open position within the clean room enclosure of the present invention.

The preferred embodiment of the clean room enclosure for portable computers is depicted in FIGS. 1-5. As shown in FIG. 3, computer 60 has a base portion 66 which contains a keyboard 68 and a touch pad 70 on its upper surface. Attached by a hinge 56 along its back edge is a lid 62 which folds between a lowered closed position over the keyboard, and an open opposition which permits viewing of an output screen 64 on the lower side of the lid. Portable computer enclosure 20 comprises a sleeve portion 22 and flap portions 24 and 26. Sleeve portion 22 has rectangular upper 28, lower 34 and side 38 segments that conform generally to the size and shape of the base of the portable computer which it is to cover. The sleeve portion has an open back 58 (FIG. 2) though which the computer 60 is to be inserted. Extending from a position adjacent opening 58, the enclosure flap portion has a first flap portion or panel 24 intended to cover the upper surface of lid 62 (opposite screen 64) and a second flap portion or panel 26 which wraps around and covers the lower surface of lid 62, over screen 64. A transition panel 46 (FIG. 1) is disposed between panel segments 24 and 26 to accommodate the thickness of the computer lid 62 at the edge opposite the hinge.

To permit use of the keyboard, sleeve 22 contains a flexible transparent portion 32 that is sized to conform to the size of the computer keyboard 68, and permit the user to push the keys for data entry. Optionally, if the laptop has a touch pad 70, a flexible transparent panel 30 permits operation of the touch pad therethrough by the user's finger. The size of sleeve 22 is such that it fits snugly around the keyboard and base. To prevent passage of contaminants out and around sleeve opening 58, an elastic hem 72 or other seal may be incorporated around the opening. Terminal lid flap 26 contains a transparent panel 48 which is sized to register with the dimensions of computer screen 64. If the computer is a touch screen model, this transparent panel should be flexible as well.

To secure the flap portions around the computer lid 62, sealing flap ends 50a and 50b extend outward along the side edges of terminal flap 26 and contain snap closures 52 which register with and may be secured to complimentary snap closures 54 along the side edges of flap segment 24, to seal the flap portion around the computer lid along the back or upper side of the lid. A transition panel 38 is disposed between flap panel segment 24 and the lower side 34 of sleeve 22. Transition segment 38 may contain openings 40 and 42 for typical power supply and communication connectors used with portable computers. The flap folds along line 36 between transition panel 38 and sleeve lower portion 34.

Figure 5:
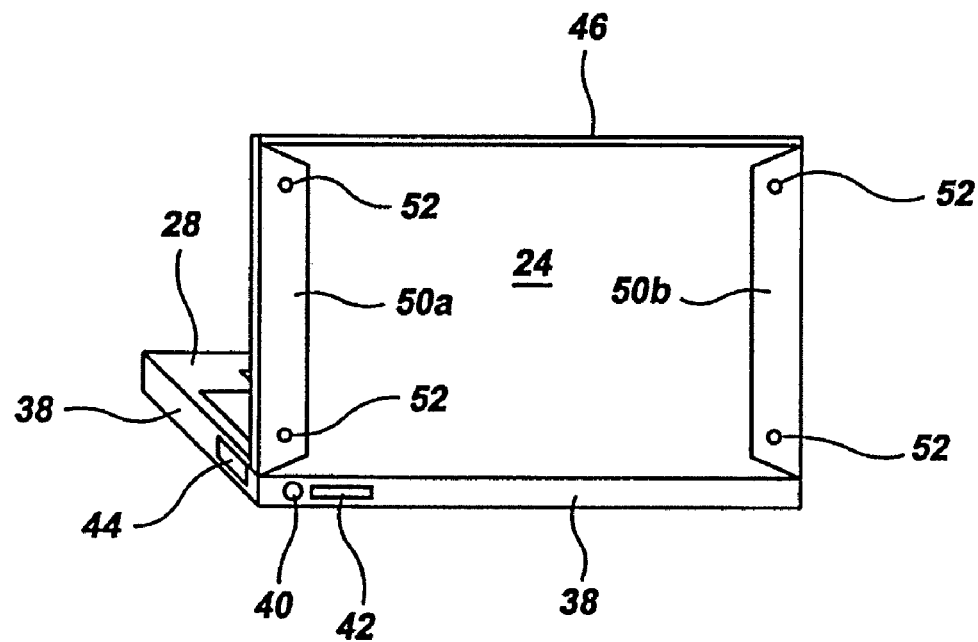
FIG. 5 is a rear perspective view of a portable computer within the clean room enclosure of the present invention.

While in the preferred embodiment the entire material utilized in the enclosure, other than the transparent panels, comprises a breathable vent able to restrict the passage of contaminant particles, in another embodiment of the invention, the material for the enclosure is made of non-breathable material. In this case, only a portion of the enclosure comprises a vent. As shown in FIGS. 2 and 5, such vents may comprise breathable vent panels 44 along the sides of sleeve portion 22. Such vent panels may be incorporated in other locations as well.

In use, the enclosure of the present invention is laid in a substantially flat position, as shown in FIG. 3, and the computer base is slid through the sleeve opening, inside the sleeve, so that the computer keyboard 68 is visible and usable through flexible transparent panel 32. The enclosure flap portion is then wrapped upward around the back (top) side of lid 62, and panel 26 is overlaid on the front (lower) side of the lid so that transparent panel 48 is in registration with computer screen 64. Edge flaps 50a, 50b are then wrapped around and secured along the backside of computer lid 62 and secured to provide a seal against the passage of contaminant particles.

The user may then bring the portable computer, suitably sealed into the clean room and use the computer through the flexible keyboard panel 32 and transparent screen panel 48, while the enclosure restricts passage of contaminant particles from the computer into the clean room by the vent. As indicated above this vent may be a substantial part of the enclosure material or may be only a portion thereof in a panel. If needed, the computer may be removed outside the clean room, and the enclosure cleaned of contaminants prior to the next use.

Thus, the present invention provides a method and apparatus for protecting clean room environments from contamination by portable computers. The portable computer enclosure may be easily employed by the clean room worker, does not interfere with use of the computer and is readily reusable.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A clean room enclosure for a portable computer, the computer having a keyboard portion and a screen portion connected by a hinge foldable between closed and open positions, the screen portion being disposed in a lid having a front side containing the screen, a back side opposite the screen, a top edge opposite the hinge and side edges between the top edge and the hinge, the enclosure comprising:

a flexible sleeve for receiving the keyboard portion of the portable computer, the sleeve having an opening through which the keyboard portion is inserted and removed, a transparent panel portion for viewing and operating the keyboard and a gas permeable vent portion restricting flow of contaminant particles;

a flexible flap extending from the flexible sleeve continuously from the hinge, along the lid back side, over the lid top edge and around the lid front side and wrapping around and over the screen portion of the portable computer, the flexible flap having a transparent portion for viewing the screen; and a reclosable seal adjacent a side edge of the lid between the front and back sides for securing the flexible flap around the screen portion whereby the enclosure restricts passage of contaminant particles from the computer.

2. The enclosure of claim 1 wherein the reclosable seal is secured along the back side of the computer lid along the side edges.

3. The enclosure of claim 1 wherein the flexible flap includes edges wrapping around the side edges of the computer lid.

4. The enclosure of claim 1 wherein the gas permeable vent portion and the reclosable seal restrict flow of contaminant particles larger than 0.5 microns in size.

5. The enclosure of claim 1 further including a reclosable seal for securing the flexible sleeve opening to restrict flow of contaminant particles.

6. The enclosure of claim 1 wherein the flexible flap extends from the flexible sleeve adjacent the sleeve opening.

7. The enclosure of claim 1 wherein, except for the transparent panel portion, the gas permeable vent portion comprises a substantial portion of the flexible sleeve.

8. The enclosure of claim 1 wherein, except for the gas permeable vent portion, the flexible sleeve comprises a substantially gas impermeable material.

9. The enclosure of claim 1 wherein the flexible flap includes a gas permeable vent portion restricting flow of contaminant particles.

10. The enclosure of claim 1 wherein the transparent panel portion for viewing and operating the keyboard is non-breathable.

11. The enclosure of claim 10 wherein the reclosable seal is adjacent opposite side edges of the lid between the front and back sides.

12. The enclosure of claim 11 wherein the reclosable seal is secured along the back side of the computer lid along the side edges.

13. The enclosure of claim 11 wherein the flexible flap includes edges wrapping around the side edges of the computer lid.

14. The enclosure of claim 10 wherein the gas permeable vent portion and the reclosable seal restrict flow of contaminant particles larger than 0.5 microns in size.

15. The enclosure of claim 10 further including a reclosable seal for securing the flexible sleeve opening to restrict flow of contaminant particles.

16. The enclosure of claim 10 wherein the flexible flap extends from the flexible sleeve adjacent the sleeve opening.

17. The enclosure of claim 12 wherein, except for the transparent panel portion, the gas permeable vent portion comprises a substantial portion of the flexible sleeve.

18. The enclosure of claim 10 wherein, except for the gas permeable vent portion, the flexible sleeve comprises a substantially gas impermeable material.

19. The enclosure of claim 10 wherein the flexible flap includes a gas permeable vent portion restricting flow of contaminant particles.

* * * * *